(12) United States Patent
Koelsch et al.

(10) Patent No.: US 12,012,009 B2
(45) Date of Patent: Jun. 18, 2024

(54) AUTONOMOUS CHARGING SYSTEMS FOR BATTERY POWERED TRANSPORT REFRIGERATION UNITS

(71) Applicants: Ronald Koelsch, Roscommon, MI (US); Raymond Shea, Jr., St. Charles, MO (US); Frank Bongiorno, III, Mesa, AZ (US)

(72) Inventors: Ronald Koelsch, Roscommon, MI (US); Raymond Shea, Jr., St. Charles, MO (US); Frank Bongiorno, III, Mesa, AZ (US)

( * ) Notice: Subject to any disclaimer, the term of this patent is extended or adjusted under 35 U.S.C. 154(b) by 381 days.

(21) Appl. No.: 17/385,322

(22) Filed: Jul. 26, 2021

(65) Prior Publication Data

US 2022/0032795 A1 Feb. 3, 2022

Related U.S. Application Data

(60) Provisional application No. 63/057,963, filed on Jul. 29, 2020.

(51) Int. Cl.
*B60L 53/16* (2019.01)
*B60L 53/35* (2019.01)
*B60S 9/08* (2006.01)
*B62D 53/08* (2006.01)

(52) U.S. Cl.
CPC .............. *B60L 53/16* (2019.02); *B60L 53/35* (2019.02); *B60S 9/08* (2013.01); *B62D 53/0857* (2013.01)

(58) Field of Classification Search
CPC . B60L 53/16; B60L 53/35; B60S 9/08; B62D 53/0857

USPC ........................................................ 320/109
See application file for complete search history.

(56) References Cited

U.S. PATENT DOCUMENTS

| | | | | |
|---|---|---|---|---|
| 3,100,384 | A * | 8/1963 | Lowensohn | F25D 29/003 62/239 |
| 4,863,184 | A * | 9/1989 | Mena | B60S 9/08 254/419 |
| 9,415,660 | B2 * | 8/2016 | Koelsch | B60H 1/00264 |
| 2011/0114398 | A1 * | 5/2011 | Bianco | B60K 1/04 320/109 |
| 2012/0242060 | A1 * | 9/2012 | Schubert | B61D 3/184 280/423.1 |
| 2016/0129753 | A1 * | 5/2016 | Koelsch | B60H 1/00014 62/235.1 |

(Continued)

FOREIGN PATENT DOCUMENTS

| | | | | |
|---|---|---|---|---|
| CN | 215154002 | U * | 12/2021 | |
| CN | 116601045 | A * | 8/2023 | ........... B60K 7/0007 |

(Continued)

*Primary Examiner* — Suresh Memula

(57) ABSTRACT

An automatic coupling system for connecting grid power to charge the battery of a battery powered electric semi-trailer reefer and a method for automatically, directly providing electrical power to a battery powered electric semi-trailer reefer battery. The method comprises providing an auxiliary power source and electrically connecting said auxiliary power source to a parking surface charging pad for each leg of a landing gear for a battery powered electric semi-trailer reefer. The parking surface charging pad contains an electrode plate in it. Also provided is a landing gear electrical contact pad containing an electrode on a lower end of each leg of the landing gear.

7 Claims, 5 Drawing Sheets

(56) References Cited

U.S. PATENT DOCUMENTS

| | | | | |
|---|---|---|---|---|
| 2019/0329650 A1* | 10/2019 | Quill | ............ | B60K 25/08 |
| 2020/0233410 A1* | 7/2020 | Burns | ............ | B60L 50/66 |
| 2022/0111716 A1* | 4/2022 | McKibben | ............ | B60L 58/26 |
| 2022/0267127 A1* | 8/2022 | Smith | ............ | B66F 5/00 |
| 2022/0402326 A1* | 12/2022 | Koelsch | ............ | B60H 1/00014 |
| 2022/0410990 A1* | 12/2022 | Rust | ............ | B62D 53/0842 |
| 2023/0022717 A1* | 1/2023 | Sepe, Jr. | ............ | B60H 1/3232 |
| 2023/0226920 A1* | 7/2023 | Lee | ............ | B60L 7/10 |
| | | | | 701/70 |
| 2023/0278651 A1* | 9/2023 | Genter | ............ | B60L 8/003 |
| | | | | 180/14.1 |

FOREIGN PATENT DOCUMENTS

| | | | | |
|---|---|---|---|---|
| EP | 2266831 A2 * | 12/2010 | ............ | B60K 25/08 |
| EP | 4059841 A1 * | 9/2022 | | |
| GB | 2609196 A * | 2/2023 | ............ | B60H 1/00014 |
| WO | WO-2018219226 A1 * | 12/2018 | ............ | B60L 53/11 |
| WO | WO-2021222204 A1 * | 11/2021 | ............ | B60S 9/08 |
| WO | WO-2023030869 A1 * | 3/2023 | | |
| WO | WO-2023082025 A1 * | 5/2023 | | |

* cited by examiner

AUTONOMOUS CHARGING SYSTEMS FOR BATTERY POWERED TRANSPORT REFRIGERATION UNITS

CROSS-REFERENCE TO RELATED APPLICATIONS

This application claims priority to U.S. Provisional patent Application No. 63/057,963 filed on Jul. 29, 2020.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Text The present invention relates to refrigerated containers (reefers) and more specifically to battery powered electric transport refrigeration units (TRU) commonly used on reefers. These electric reefers are used for cold transport of temperature sensitive cargo by semi-trailer or intermodal containers. The advent of the battery powered electric TRU brings a need for efficient means to charge the large battery mounted on the semi-trailer reefer that powers the refrigeration compressor motor, fan motors and all electrical TRU components. This battery has a typical capacity of 100 kilowatt-hours.

The electrical energy to do this is provided by, in one instance, a semi-trailer wheel driven generator, and in a second instance, solar panels and in the third instance, an electric power grid (the electrical power source/auxiliary power unit). This auxiliary power unit (APU) differs from a standard battery charger in that it must be able to charge the battery even when the TRU is running. This invention deals with devices and methods that use sourced electrical power efficiently and safely to charge the battery that runs the TRU and enhance the utility of the reefer.

Prior art battery powered TRUs traditionally access a grid using a plug-in cord that connects the APU for charging the battery. Operations personnel must do this manually each time the semi-trailer refer is moved from parking, to loading, to staging, etc. This human intervention is expensive, unreliable, time consuming, and creates safety hazards. This invention uses the landing gear legs of the semi-trailer to automatically couple to the grid electrical power source.

Food industry warehouse infrastructure for changing the electric reefer battery must be simple and safe. Present methods involve overhead cabling or long plug-in cords. They are cumbersome and especially dangerous if high voltage is used for battery charging. These present methods plug 480-volt AC 3-phase power into stationary reefers and are prone to arch flash hazards and reefer chassis electrification. The charging infrastructure must take into account the food warehouse logistics.

The instant invention for APU charging best accommodates everyday warehouse operations by eliminating manual plug-ins. Trailers are picked up at the loading dock for instance and moved to APU powered charging pads in the parking area. The APU converts 480-volt grid AC power into safe 48-volt DC power so the charging pads are not a shock hazard. The reefer trailer handling logistics do not need to be changed to replace diesel reefers with battery electric reefers using this autonomous battery charging. They are the same as for diesel powered semi-trailers reefers with the added advantage of no need for fueling manpower. The food distribution warehouse transition from diesel to battery electric reefers becomes seamless.

What is disclosed herein is a method for automatically, directly providing electrical power to a battery powered electric semi-trailer reefer. The method comprises providing an auxiliary power source; electrically connecting the auxiliary power source to a parking surface charging pad for each leg of a landing gear for a reefer, and parking surface charging pad containing an electrode plate.

There is then provided a landing gear electrical contact pad containing an electrode on a lower end of each leg of the landing gear. Then, the landing gear is electrically connected to the electrical contact pad to a battery located in the reefer. The reefer is then moved, with the landing gear extended, such that each lower leg and contact pad align and meet with the parking surface pad.

DETAILED DESCRIPTION OF THE DRAWINGS AND THE INVENTION

Thus, there is disclosed herein an automatic system for coupling electric grid power to the landing gear pads of a battery powered semi-trailer electric reefer. This system uses direct electrical contact between the parking surface pad and the trailer landing gear pad. Grid power is used for charging the battery.

This automatic-battery charging system can work independent of or in combination with a wheel generator mounted on the reefer, a manual grid plug-in or solar panel also mounted reefer.

Thus, what is disclosed herein is a method for automatically, directly, providing electrical power to a battery powered electric semi-trailer reefer. The method comprises providing an auxiliary power source and electrically connecting said auxiliary power source to a parking surface charging pad for each leg of a landing gear for battery powered electric semi-trailer reefer. The parking surface charging pad contains an electrode plate in it. Also provided is a landing gear electrical contact pad containing an electrode on a lower end of each leg of the landing gear.

The landing gear electrical contact pad is electrically connected to a battery located on the battery powered electric semi-trailer reefer. Then, the reefer, with landing gear extended, is moved such that each lower leg and contact pad align and meet with the parking surface pad.

System useful for this method is a system for automatically, directly, coupling electrical power to a battery electric semi-trailer reefer. The system comprises an auxiliary power source electrically connected to parking surface charging pads for each leg of a battery electric semi-trailer reefer landing gear. There are landing gear electrical contact pads containing an electrode on each lower end of each leg.

An electrical connection between the landing gear electrical contact pads and a battery located in said battery powered electric semi-trailer reefer is then made.

This invention uses the landing gear legs 1 (FIGS. 1, 3A, 3B, 4A, and 4B) of the semi-trailer to automatically couple the grid.

Figure 1:
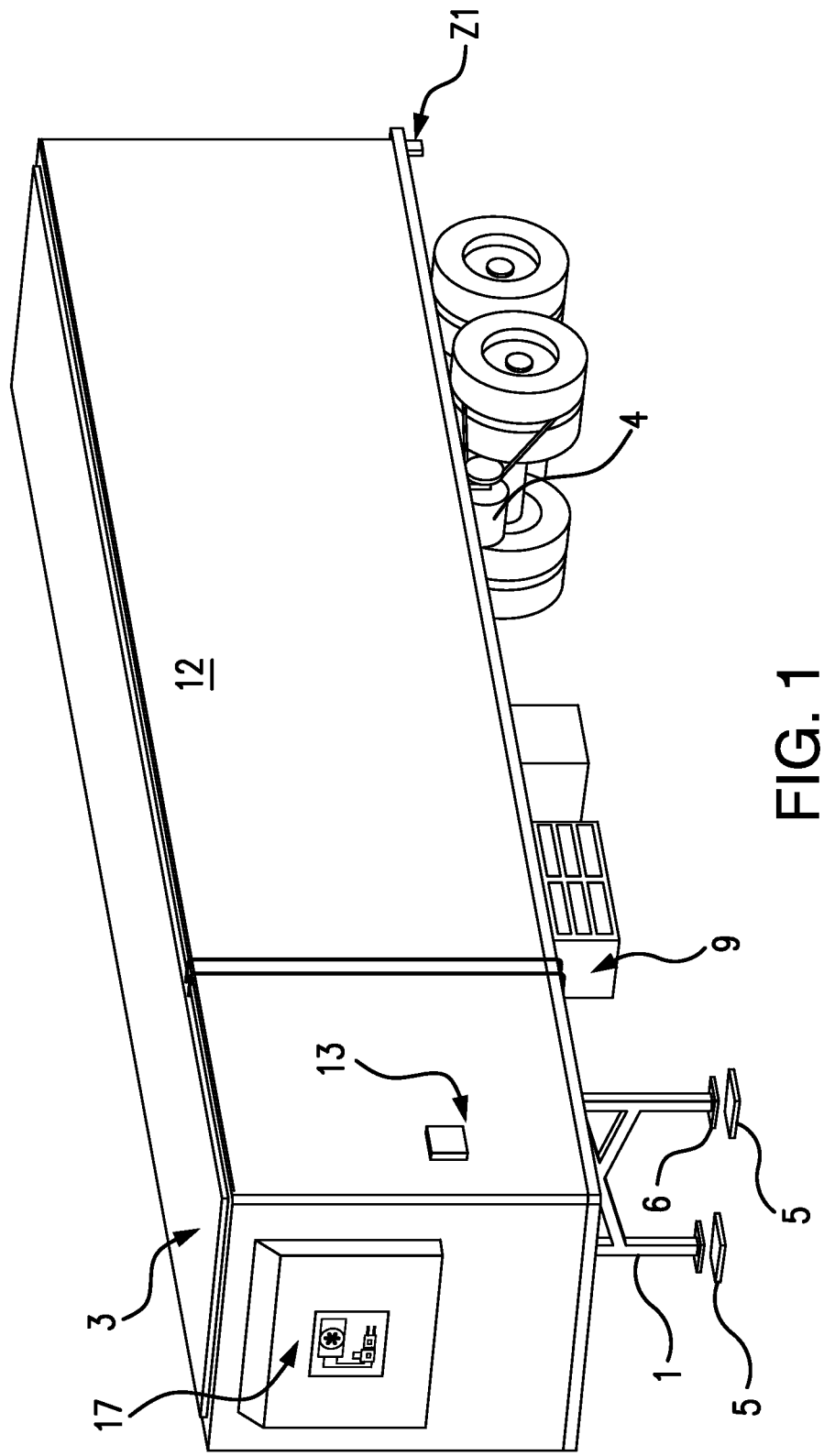
FIG. 1 is a view in perspective of a semi-trailer electric battery powered reefer with a battery and TRU.

In FIG. 1, four-battery charging sources are shown, the automatic landing gear pads 6, manual plug-in 21, solar panel 3 and wheel generator 4.

Figure 2:
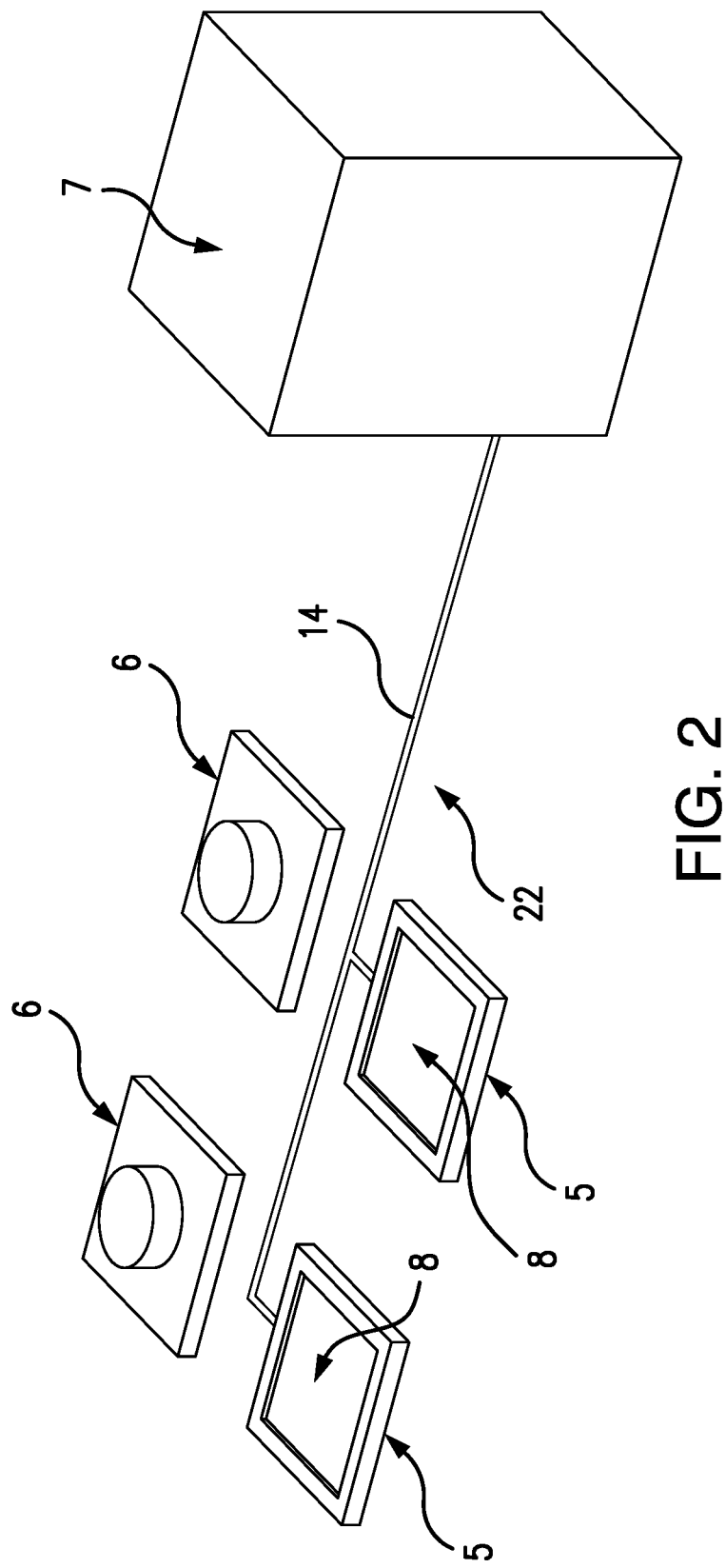
FIG. 2 depicts the landing gear pads located above the parking space charging pads that are connected to the APU.
Figure 3A:
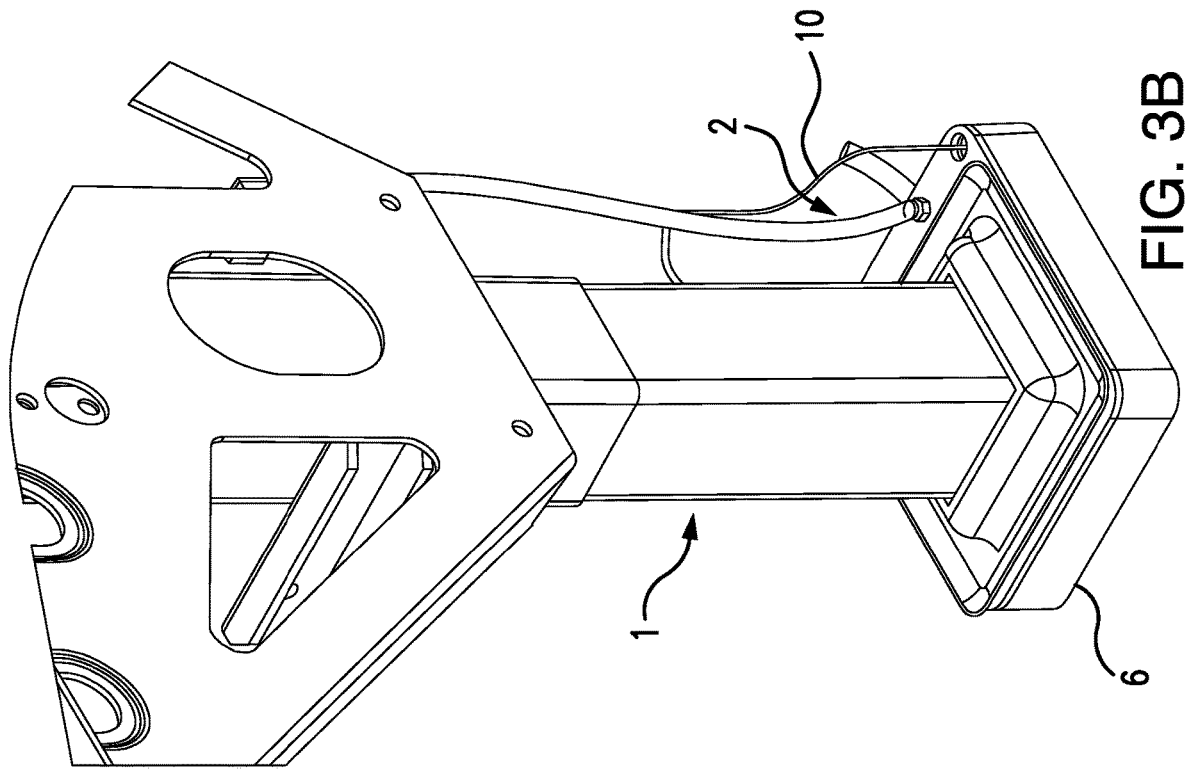
FIGS. 3A and 3b are top views in perspective of semi-trailer landing gear legs with charging pads and sensors.
Figure 3B:
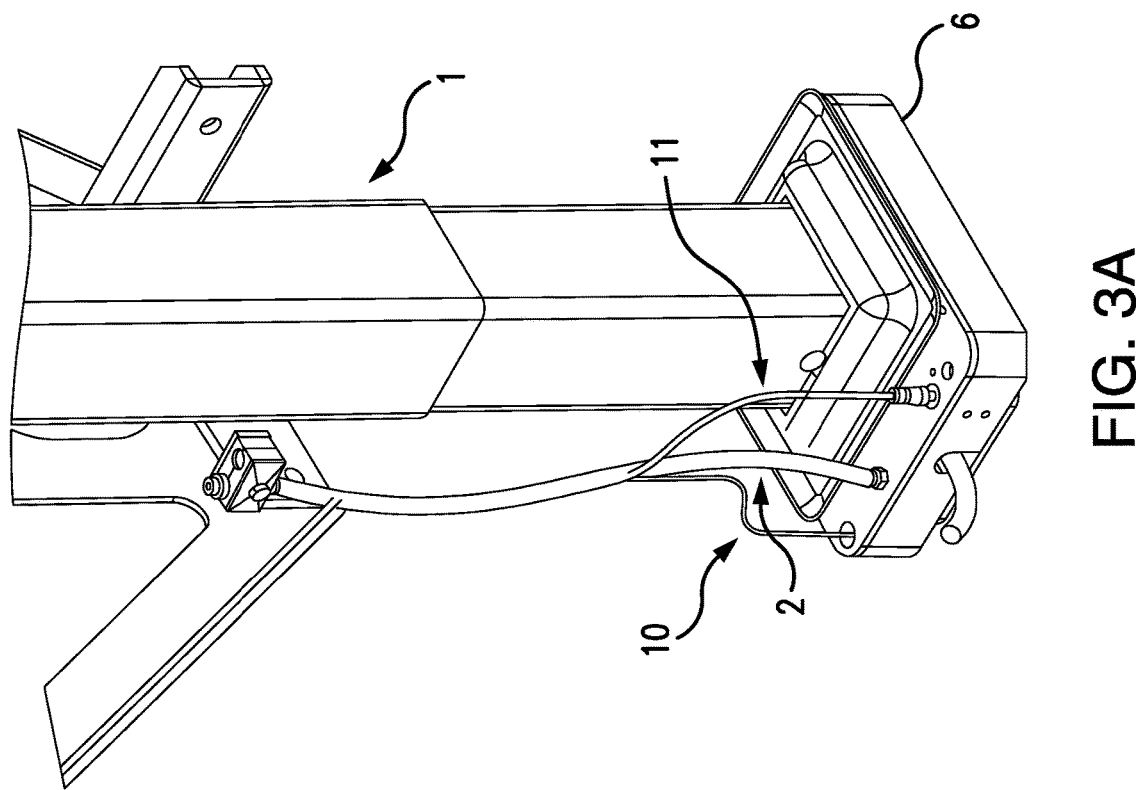

Autonomous charging is achieved by direct contact where low-voltage DC power 22 in the range of 24 to 48 volts shown in FIG. 2 is coupled via the underground wire 14 to parking lot charging pads 5. Two electrode plates 8 connected to the APU 7, that converts high-voltage grid AC power to safe low-voltage DC power, are mounted in the parking surface pads 5, positioned to match the dimensions of the semi-trailer landing gear pads 6. The APU is high voltage alternate current 480 volts-3 phase. One pad 5 is at ground potential and the other is held at a potential sufficient to charge the battery 9 (FIG. 1). Pads 6 at the bottom of the landing gear legs are fitted with contact electrodes 15 shown in FIGS. 4A and 4B that couple to the parking surface pads 5 when the semi-trailer is lowered unto the charging electrode plates 8. An infrared distance sensor 10 in FIGS. 3A and 3B, and 4A and 4B sense the proximity of the landing gear pad 6 to the charging pad 5. Compressed air hose 2 (FIGS. 4A, 3A and 3B) then provides a blast of air to clear dirt and debris from the surface of charging pads 5 and electrodes 8. Landing gear leg 1 metal electrode 15 to contact metal charging electrode 8 is anticipated and confirmed by induction proximity switch 11, sending a signal to the APU 7 to commence charging battery 9. This completes the hookup of the battery 9 to the APU 7 that converts high-voltage AC grid power to low-voltage DC battery power.

Figure 5:
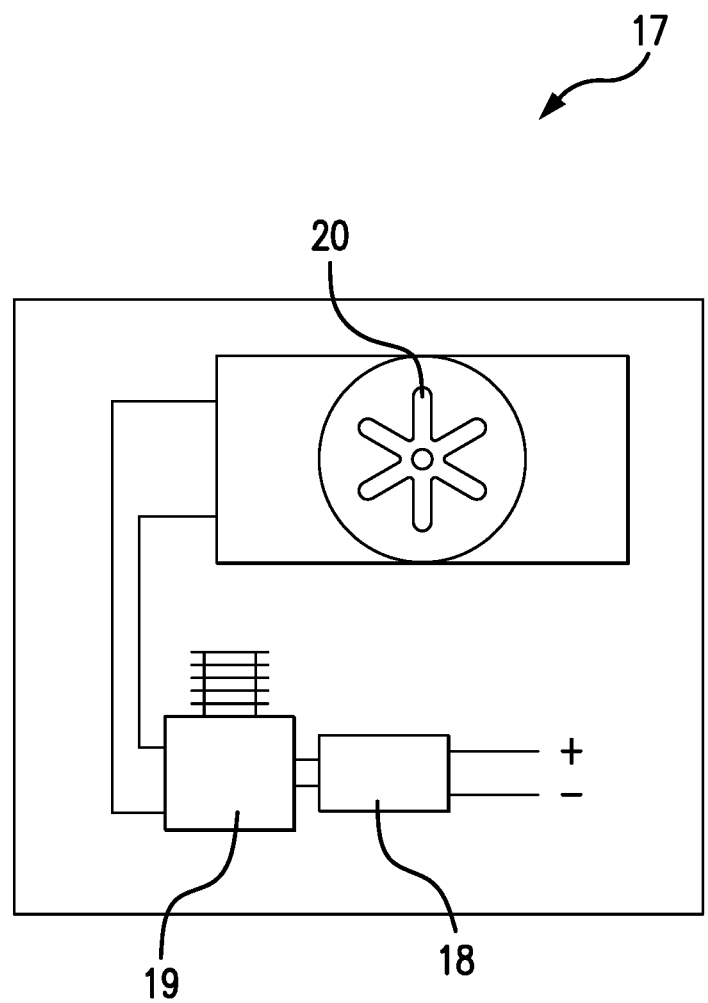
FIG. 5 is a full front view of an electric transport refrigeration unit.

Turning now to FIG. 1 there is shown a view in perspective of a battery powered electric semi-trailer reefer 12 with a battery 9 that powers the compressor 19 (FIG. 5), electric motor 18 (FIG. 5), and fan motors 20 (FIG. 5), of the battery electric TRU 17 (FIG. 5) and its electronics 13 (FIG. 1). Electric grid power is coupled to the landing gear pads 6 of the reefer 12 using parking surface pads 5.

Figure 4B:
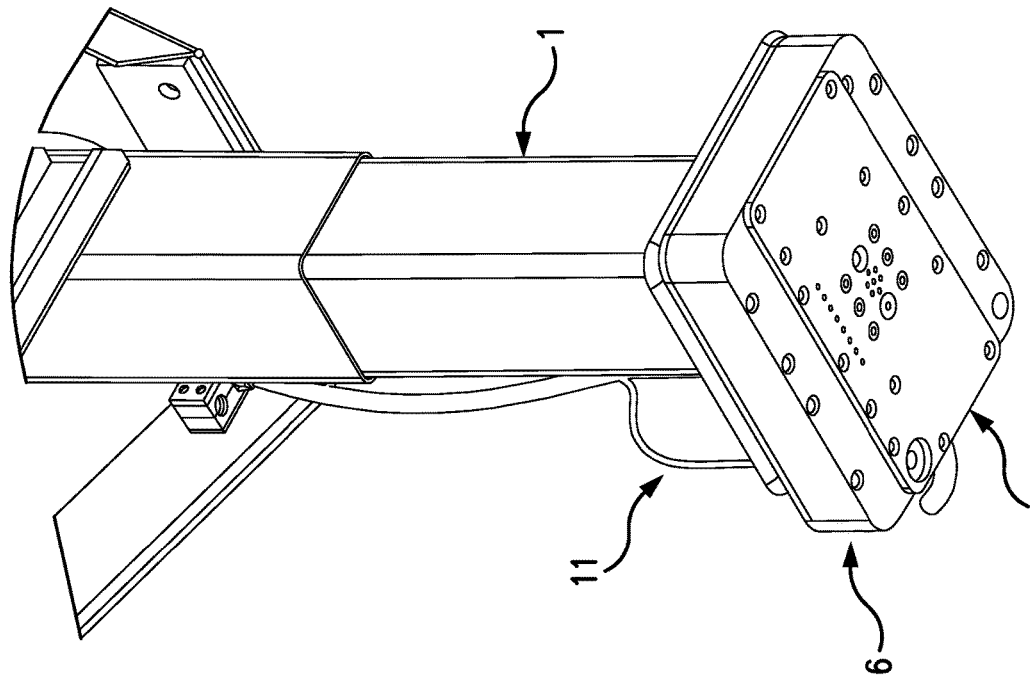
FIGS. 4A and 4B show a bottom view of the charging pads with contact electrodes.
Figure 4A:
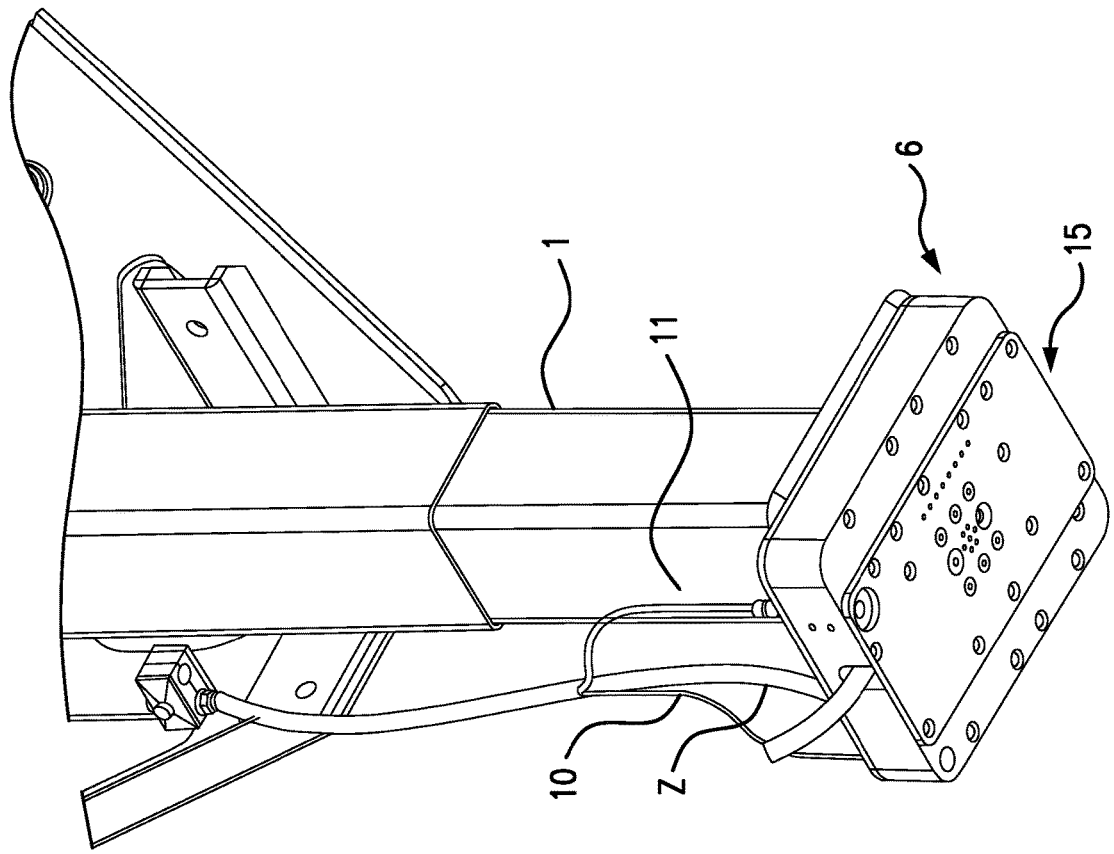

In somewhat more detail, FIG. 2 shows the direct electrical-contact system comprised of an auxiliary power unit (APU) 7 that converts high-voltage AC grid power to low-voltage DC power near 48 volts. The low-voltage DC power from the APU 7 is connected by underground wire 14 to the parking surface charging pads 5. This pad is comprised of an electrode plate 8. The reefer trailer 12 is parked so its landing gear pad 6 is within the perimeter of the charging pad surface 5. Shown in FIGS. 4A and 4B are contact electrodes 15 that extend to make electrical contact to the charging pad electrodes 8 in pad 5 when the weight of the trailer is placed on the landing gear. Grid power is then used by the APU 7 to charge the battery 9 that runs the TRU 17. Battery 9 is charged via the charging pads 5 and 6.

The direct contact automatic-battery charging system can work to charge the battery 9 independent of or in coordination with the solar panel 3, shore power grid plug-in 21 or the wheel generator 4. This autonomous battery powered electric semi-trailer reefer charging system and method is also applicable to a hybrid battery powered electric semi-trailer reefer where a generator driven by an engine is used to charge the battery.

What is claimed is:

1. A method for automatically, directly providing electrical power to a battery powered electric semi-trailer reefer, said method comprising:
    a) providing an auxiliary power source;
    b) electrically connecting said auxiliary power source to a parking surface charging pad for each leg of a landing gear for a reefer, said parking surface charging pad containing an electrode plate therein;
    c) providing a landing gear electrical contact pad containing an electrode on a lower end of each said leg of said landing gear;
    d) electrically connecting said landing gear electrical contact pad to a battery located in said reefer;
    e) moving said reefer, with landing gear extended, such that each said lower leg and contact pad align and meet with said parking surface pad.

2. A battery powered semi-trailer TRU with autonomous battery charging as claimed in claim 1 using a landing gear of the trailer.

3. The method as claimed in claim 1 wherein said electrode plate is retractable.

4. The method as claimed in 3 wherein said electrode plate is retractable using a device selected from the group consisting of treaded screw, pneumatic actuator, and ratchet.

5. A system for automatically, directly, coupling electrical power to a battery powered electric semi-trailer reefer, said system comprising:
    A) an auxiliary power source electrically connected to:
        (i) parking surface charging pads for each leg of reefer landing gear;
        (ii) landing gear electrical contact pads containing an electrode, plate on each lower end of each said leg;
    B) electrical connection between said landing gear electrical contact pads and a battery located in said reefer.

6. The system as claimed in claim 5 wherein said electrode plate is retractable.

7. The system as claimed in claim 6 wherein said electrode plate is retractable using a device selected from the group consisting of treaded screw, pneumatic actuator, and ratchet.

* * * * *